United States Patent
Yamamoto (10) Patent No.: US 6,733,415 B2
(45) Date of Patent: May 11, 2004

(54) POWER ROLLER FOR A TOROIDAL CONTINUOUSLY VARIABLE TRANSMISSION

(75) Inventor: Takeshi Yamamoto, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 21 days.

(21) Appl. No.: 09/970,622

(22) Filed: Oct. 5, 2001

(65) Prior Publication Data

US 2002/0045512 A1 Apr. 18, 2002

(30) Foreign Application Priority Data

Oct. 17, 2000 (JP) ........................ 2000-316332

(51) Int. Cl.$^7$ ............................................. F16H 15/38
(52) U.S. Cl. ......................................... 476/46; 384/615
(58) Field of Search .............................. 476/40, 42, 46; 384/605, 615

(56) References Cited

U.S. PATENT DOCUMENTS

| | | | |
|---|---|---|---|
| 4,398,778 A | * 8/1983 | Kraus | 384/615 |
| 4,523,863 A | * 6/1985 | Okoshi | 384/609 |
| 4,565,457 A | * 1/1986 | Flander | 384/450 |
| 5,482,382 A | 1/1996 | Sato et al. | 384/492 |
| 5,536,091 A | 7/1996 | Takata et al. | 384/609 |
| 5,823,911 A | * 10/1998 | Hibi | 476/40 |
| 6,375,593 B2 | * 4/2002 | Miyata et al. | 476/40 |

FOREIGN PATENT DOCUMENTS

| | | | | |
|---|---|---|---|---|
| GB | 1 338 693 | 11/1973 | | |
| JP | 62-199557 | 12/1987 | | |
| JP | 7-217660 | 8/1995 | | |
| JP | 07217661 A | * 8/1995 | ........... F16C/33/58 |
| JP | 9-126288 | 5/1997 | | |
| JP | 11062950 A | * 3/1999 | ........... F16H/19/10 |
| JP | 11132301 A | * 5/1999 | ........... F16H/15/38 |

OTHER PUBLICATIONS

"Roller Bearing Engineering", (published by Yokendo, in Tokyo, in 1978), p. 119.
Aramaki et al., "The Performance of Ball Bearings With Silicon Nitride Ceramic Balls in High Speed Spindles for Machines Tools", Journal of Tribology, vol. 110, Oct. 1988, pp. 693–698.
Tanaka et al., "Spin Moment of a Thrust Ball Bearing in Traction Fluid", Proceedings of the Mechanical Engineering Institute of Japan, No. 89–014B (1989) pp. 97–101.

* cited by examiner

Primary Examiner—David A. Bucci
Assistant Examiner—Timothy McAnulty
(74) Attorney, Agent, or Firm—Foley & Lardner LLP (57) ABSTRACT

In a power roller for a toroidal continuously variable transmission, temperature rise of a power transmission part can be prevented by suppressing the heat in a rolling contact part between a ball and an inner race groove. By setting a radius of curvature of an inner race groove less than a radius of curvature of an outer race groove, a Hertzian contact area between the inner race groove and the ball is set larger than a Hertzian contact area between the outer race groove and the ball. Further, the pitch diameter of the inner race groove is set to be less than the pitch diameter of the outer race groove. By doing so, the direction of the rotation axis of the ball can be set to a direction wherein the spin of the inner race is less than the spin of the outer race.

6 Claims, 13 Drawing Sheets

POWER ROLLER FOR A TOROIDAL CONTINUOUSLY VARIABLE TRANSMISSION

FIELD OF THE INVENTION

This invention relates to a power roller for a toroidal continuously variable transmission.

BACKGROUND OF THE INVENTION

In recent years, research has been carried out on types of vehicle transmission which continuously vary a speed ratio. In addition to belt type continuously variable transmissions, traction drive continuously variable transmissions which transmit power by the shear of oil film (referred to hereafter as toroidal CVT) are well known. Toroidal CVT allow an engine to be driven at optimum efficiency, and this technique is therefore of much interest as it permits a large improvement of fuel cost performance and power transmission. Jikkai Sho 62-199557 published by the Japanese Patent Office in 1987 discloses such a toroidal CVT.

According to Jikkai Sho 62-199557, a prior art toroidal CVT comprises a power roller having an inner race which transmits power between an input disk and an output disk via an oil film, an outer race supported by a trunnion (power roller supporting member), and a thrust ball bearing which supports the inner race on the outer race so that is free to rotate.

This thrust ball bearing comprises plural balls, a holder which holds these balls, and an inner race groove and outer race groove formed respectively in opposite surfaces of the inner race and outer race. Both of these race grooves have an arc-shaped cross-section, and the whole forms a ring. In the prior art, a radius of curvature $r_i$ of the inner race groove and a radius of curvature $r_o$ of the outer race groove are identical, and the pitch diameter $\phi d_i$ of the inner race groove and the pitch diameter $\phi d_o$ of the outer race groove are also identical.

SUMMARY OF THE INVENTION

However, in the prior art toroidal continuously variable transmission, the direction of the rotation axis of the balls of the thrust ball bearing cannot be controlled. Therefore, if the vehicle is driven for a long-time while the spin angular velocity of the balls relative to the inner race groove is large, the rolling contact parts of the balls and inner race groove generate heat, and the temperature of the inner race groove rises. The inner race transmits power from the input disk to the output disk by traction drive. A traction coefficient degreases together with temperature rise of an oil film between the inner race and input disk or between the inner race and output disk, and when the temperature of the inner race rises, power transmission efficiency declines.

It is therefore an object of this invention to provide a toroidal continuously variable transmission which can prevent decrease of power transmission efficiency due to temperature rise of an oil film of a power transmission part.

In order to achieve above objects, this invention provides a power roller for a toroidal continuously variable transmission, comprising an inner race for transmitting power between an input disk and an output disk via an oil film, an outer race supported by a power roller support member, and a thrust ball bearing for supporting the inner race on the outer race such that it is free to rotate.

The thrust ball bearing has an inner race groove having an arc-shaped cross-section formed in the inner race, and an outer race groove having an arc-shaped cross-section formed in the outer race, an annular space defined by the inner race groove and outer race groove, plural balls disposed in this annular space, and a holder supporting the balls.

In the contact part between each of the balls and inner race groove, a first spin, which is the slip between each of the balls and inner race groove wherein each of the balls and inner race groove rotate relative to each other, occurs, in the contact part between each of the balls and outer race groove, a second spin, which is the slip between each of the balls and outer race groove wherein each of the balls and outer race groove rotate relative to each other, occurs, and the direction of the rotation axis of the balls defined by the balance between the frictional moment of the first spin and the frictional moment of the second spin, is set to a direction in which the angular velocity of the first spin is less than the angular velocity of the second spin.

The details as well as other features and advantages of this invention are set forth in the remainder of the specification and are shown in the accompanying drawings.

DESCRIPTION OF THE PREFERRED EMBODIMENTS

Referring to FIG. 1 to FIG. 4, a first embodiment of this invention will now be described.

Figure 1:
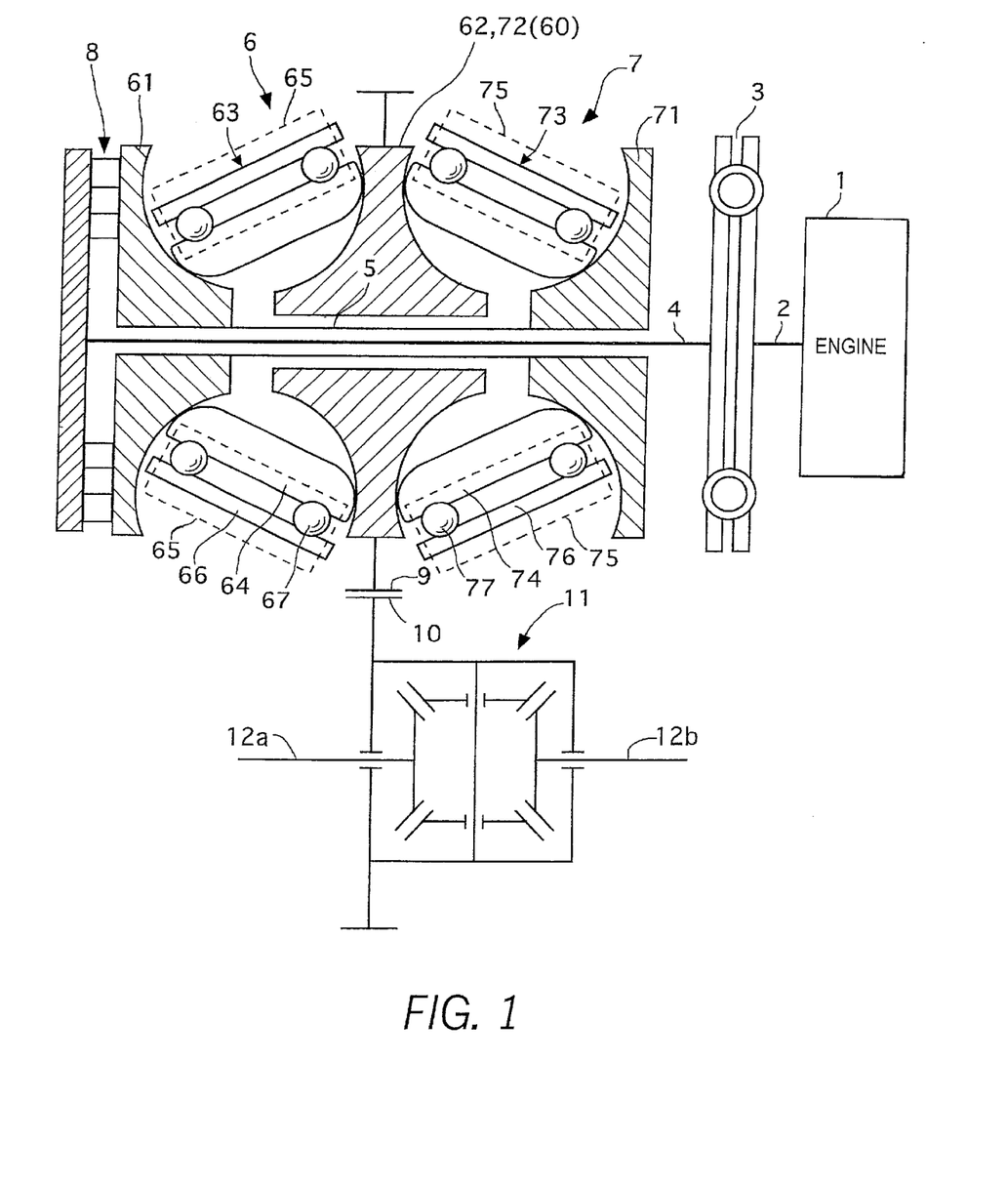
FIG. 1 is a schematic view of a toroidal continuously variable transmission according to this invention.

The mechanical construction of a half toroidal continuously variable transmission (referred to hereafter as toroidal CVT) having a dual cavity will first be described. The toroidal CVT comprises an input shaft 4 connected to an output shaft 2 of an engine 1 via a torsional damper 3, and a hollow shaft 5 formed coaxially on the outside of the shaft 4 and supported free to rotate relative to it. A first toroidal CVT 6 and second toroidal CVT 7, and a loading cam 8 which presses input disks 61, 71 with a load which is directly proportional to an input torque, are disposed coaxially on these shafts 4,5.

The first toroidal CVT 6 and second toroidal CVT 7 have a substantially identical construction. These elements comprise the two input disks 61, 71 and two output disks 62, 72 whereof the opposite surfaces form a toroidal space with an arc-shaped cross-section. Two power rollers 63 which transmit power are held between the input disk 61 and output disk 62. Two power rollers 73 which transmit power are held between the input disk 71 and output disk 72.

The first toroidal CVT 6 arranged on the far side of the engine comprises the input disk 61 on the opposite side to the engine, and the output disk 62 on the engine side. The second toroidal CVT 7 disposed near the engine 1 comprises the input disk 71 on the engine side and the output disk 72 on the opposite side to the engine. The two input disks 61, 71 are respectively slidably joined to the two ends of the hollow shaft 5. The two output disks 62, 72 (referred to as one-piece output disk 60) are formed in one piece, and supported free to rotate in the middle part of the hollow shaft 5.

One of the power rollers 63 comprises an inner race 64 which transmits power from the input disk 61 to the output disk 62 via an oil film, an outer race 66 supported by a trunnion 65 (power roller supporting member), and a thrust ball bearing 67 which supports the inner race free to rotate relative to the outer race 66.

One of the power rollers 73 comprises an inner race 74 which transmits power from the input disk 71 to the output disk 72 via an oil film, an outer race 76 supported by a trunnion 75 (power roller supporting member), and a thrust ball bearing 77 which supports the inner race free to rotate relative to the outer race 76.

An output gear 9 is provided on the outer circumference of the one-piece output disk 60. The output gear 9 meshes with a drive gear 10 of a differential device 11. This transmits drive force to left and right drive wheels via drive shafts 12a, 12b extending to the left and right from the differential device 11.

Figure 2:
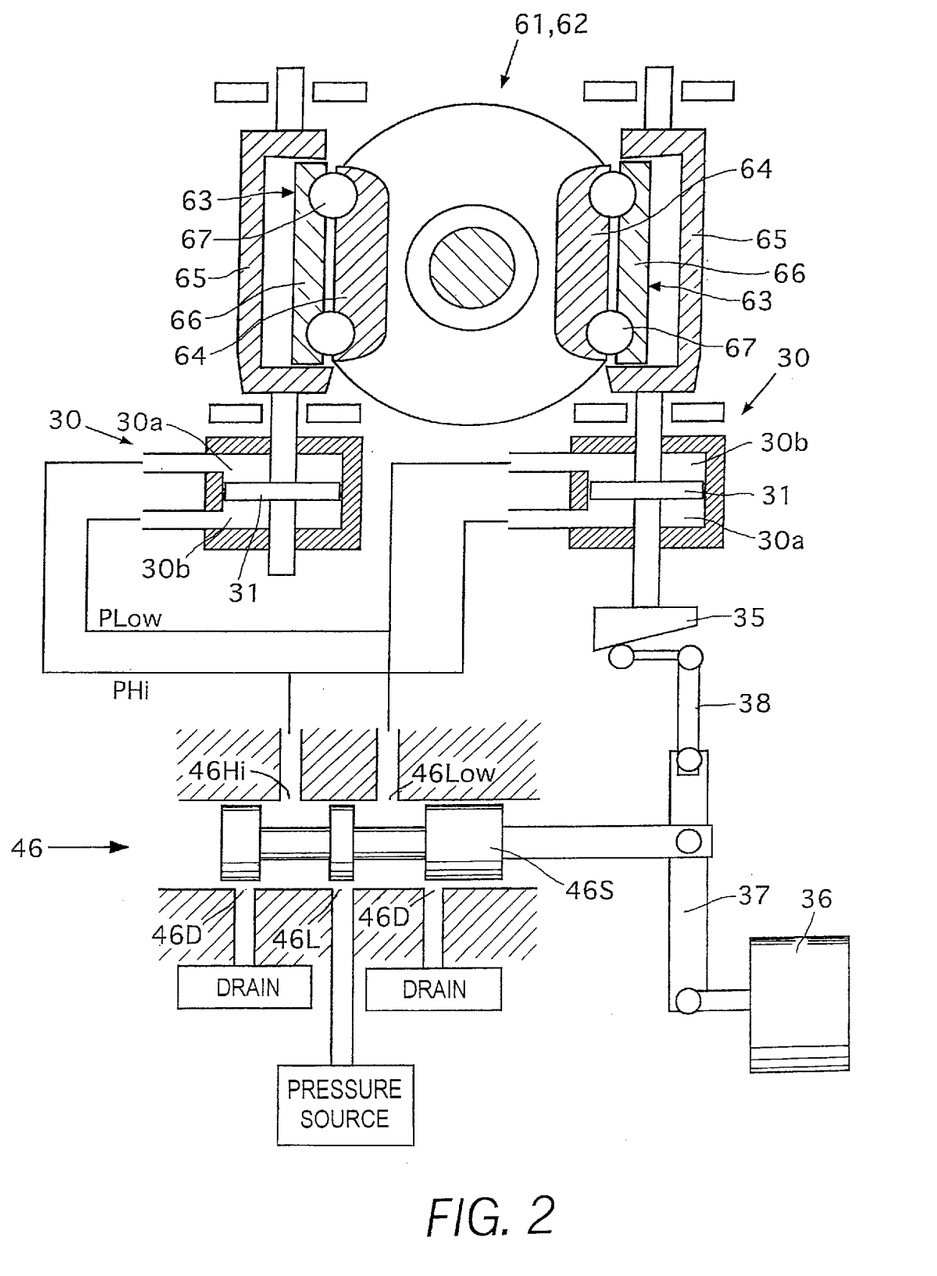
FIG. 2 is a schematic view showing a speed change control system used with the toroidal continuously variable transmission according to this invention.

The oil pressure system for managing the speed change of the first toroidal CVT 6 and the speed change system of the first toroidal CVT 6 will now be described referring to FIG. 2. Speed change of the first toroidal CVT 6 is performed by moving the trunnion 65 which supports the power roller 63 up and down from a balance point. Due to this displacement, at the contact point, a difference arises between the vectors of the rotation directions of the inner race 64 and input disk 61 and between the vectors of the rotation directions of the inner race 64 and output disk 62, so the power roller 63 gyrates.

The trunnion 65 is connected to a servo piston 31 of an oil pressure servo 30, and displaces due to the differential pressure between the oil in a cylinder 30a on the high side and the oil in a cylinder 30b on the low side. The oil pressure of the high side cylinder 30a and the oil pressure of the low side cylinder 30b are controlled by a shift control valve 46.

Due to the displacement of a spool 46S in the valve, the shift control valve 46 allows oil supplied from a line pressure port 46L to flow to a high side port 46Hi or a low side port 46Low. Oil then flows from the other of the low side port 46Low or high side port 46Hi to a drain port 46D. Thus, the differential pressure in the oil pressure servo 30 varies.

A precess cam 35 is fitted to one of the trunnions 65, and a groove is cut in the precess cam 35. The groove in the precess cam 35 is in contact with one end of an L link 38, and the end of the L link 38 is freely supported by one end of an I link 37. Hence, the displacement and gyration angle of the trunnion 45 is fed back to the I link 37.

The other end of the I link 37 is connected to a step motor 36, and the spool 46S of the shift control valve 46 mentioned above is freely supported on the I link 37. Therefore, the displacement of the spool 46S is determined from the displacement of the step motor 36 and feedback from the precess cam 35.

Figure 3:
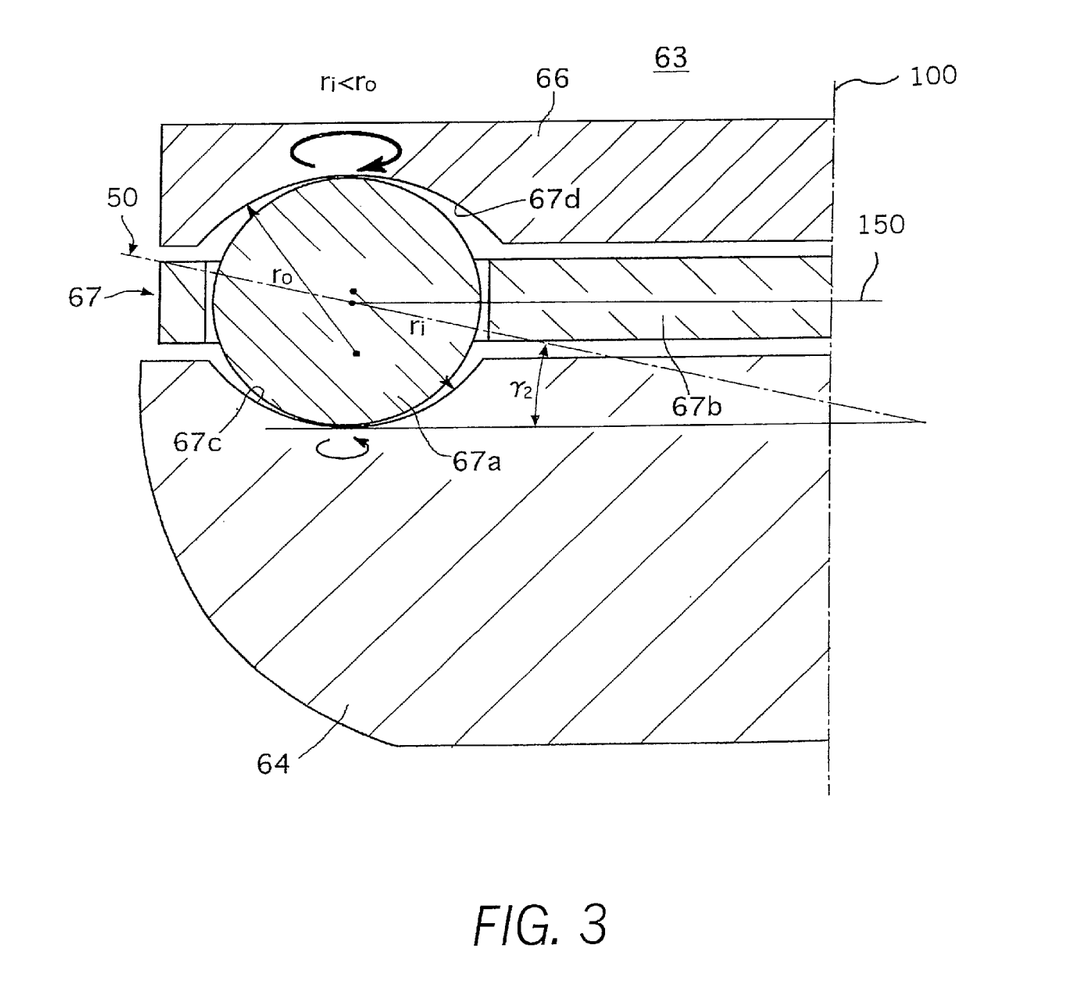
FIG. 3 is a partial sectional view of a power roller according to the first embodiment of this invention.

Referring to FIG. 3, the power roller 63 of the toroidal CVT according to the first embodiment will now be described. In FIG. 3, reference numeral 63 denotes the power roller, reference numeral 64 denotes the inner race, reference numeral 66 denotes the outer race and reference numeral 67 denotes the thrust ball bearing.

The thrust ball bearing 67 comprises plural balls 67a, a holder 67b which holds these balls 67a, an inner race groove 67c formed on the surface of the inner race 64 facing the outer race 66, and an outer race groove 67d formed on the surface of the outer race 66 facing the inner race 64. The inner race groove 67c and outer race groove 67d have arc-shaped cross-sections, and define an annular space.

The plural balls 67a are situated in the annular space, and come in contact with the inner race groove 67c and outer race groove 67d. Each of the plural balls 67a revolves around the rotation axis 100 of the power roller 63, rotating about a rotation axis 50, because of the rotation of the inner race 64. The holder 67b revolves around the rotation axis 100 of the power roller 63, together with the balls 67a.

Referring to FIG. 3, a rotation axis angle $\gamma$ is defined as the angle formed by the rotation axis 50 of the ball 67a and a plane perpendicular to the rotation axis 100 of the power roller 63. In other words, a rotation axis angle $\gamma$ is defined as the angle between a rotation axis 50 of the ball 67a and the tangential plane on the inner race side of the ball 67a perpendicular to a rotation axis 100 of the power roller 63, as shown in FIG. 3.

In FIG. 3, when the rotation axis 50 of the ball 67a inclines to the lower right, the rotation axis angle $\gamma$ takes a positive value. In other words, when the rotation axis 50 of the ball 67a inclines towards the rotation axis 100 of the power roller 63 and toward the inner race 64, the rotation axis angle $\gamma$ takes a positive value.

Describing this in still other terms, the rotation axis angle $\gamma$ takes a positive value when the intersection point between the rotation axis 100 of the power roller 63 and the rotation axis 50 of the ball 67a lies on the side of the inner race 64 with respect to the revolution plane 150 of the balls which passes through the centers of the balls 67a and is perpendicular to the rotation axis 100 of the power roller 63.

When the rotation axis 50 of the ball 67a is perpendicular to the rotation axis 100 of the power roller 63, the rotation axis angle γ is zero.

In FIG. 3, when there is an inclination to the upper right, the rotation axis angle γ takes a negative value. In other words, when the rotation axis 50 of the ball 67a extends simultaneously towards the rotation axis 100 of the power roller 63 and the outer race 66, the rotation axis angle γ takes a negative value.

The ball 67a rotates as it slides on the inner race groove 67c. In the rolling contact part between the ball 67a and the inner race groove 67c, sliding between the ball 67a and inner race groove 67c in such a manner that the ball 67a and inner race groove 67c rotate relative to one another is defined as an inner race spin (first spin). The frictional moment associated with the inner race spin is referred to as an inner race spin moment (first spin moment) $M_{si}$.

The ball 67a also rotates as it slides on the outer race groove 67d. In the rolling contact part between the ball 67a and outer race groove 67d, sliding between the ball 67a and outer race groove 67d in such a manner that the ball 67a and outer race groove 67d rotate relative to one another is defined as an outer race spin (second spin). The frictional moment associated with the outer race spin is referred to as an outer race spin moment (second spin moment) $M_{so}$. The inner race and outer race spins cause power loss and result in the generation of heat.

As described on page 119 of "Roller Bearing Engineering" (published by Yokendo, in Tokyo, in 1978), the spin angular velocity on the side of the inner race 64 and outer race 66 depends on the rotation axis angle γ of the ball 67a.

According to this reference, an inner race spin angular velocity $\omega_{si}$ and outer race spin angular velocity $\omega_{so}$ are defined by the following equations:

$$\omega_{si} = (\omega_i - \omega_c) \sin \alpha + \omega_b \sin(-\gamma y) \quad (1)$$

$$\omega_{so} = \omega_c \sin \alpha + \omega_b \sin \gamma \quad (2)$$

Here, $\omega_i$ is the angular velocity of the inner race, $\omega_c$ is the revolution angular velocity of the ball, $\omega_b$ is the rotation angular velocity on the ball, α is the contact angle (this is the angle subtended by a straight line joining the contact point of the ball and inner race and the contact point of the ball and outer race, with the revolution plane 150). Normally, ($\omega_i - \omega_c$) is equal to $\omega_c$.

If the rotation axis angle γ is positive, the inner race spin angular velocity $\omega_{si}$ is less than the outer race spin angular velocity $\omega_{so}$. If the rotation axis angle γ is negative, the inner race spin angular velocity $\omega_{si}$ is larger than the outer race spin angular velocity $\omega_{so}$.

According to page 696 of "Transactions of the ASME Vol. 1100: October 1988", the rotation axis angle γ is effectively determined by the balance between the first spin moment $M_{si}$ and second spin moment $M_{so}$. Specifically, the rotation axis angle γ is determined under the condition $M_{si} \approx M_{so}$.

In the first embodiment, by making the radius of curvature $r_i$ of the inner race groove 67c smaller than the radius of curvature $r_o$ of the outer race groove 67d, the Hertzian contact area between the inner race groove 67c and ball 67a is set larger than the Hertzian contact area between the outer race groove 67d and ball 67a. Thus, due to a reason described later, the rotation axis angle γ of the ball 67a can be set to a rotation axis angle γ2 which is a positive value. Specifically, the rotation axis 50 of the ball 67a is set in a direction pointing towards both the rotation axis of the power roller 63 and the inner race 64.

At this rotation axis angle γ2, the inner race spin angular velocity $\omega_{si}$ is smaller than the outer race spin angular velocity $\omega_{so}$. Consequently, the heat generated in direct proportion to the product of the spin moment and spin angular velocity is suppressed smaller on the inner race side. Also, decrease of the traction coefficient accompanying increase of oil film temperature is suppressed, and decrease of the power transmission performance due to the ball spin of the thrust ball bearings 67, 77 can be prevented.

In the power roller 73 also, the rotation axis angle γ of the ball 67a can be set to the rotation axis angle γ2 at which the inner race spin angular velocity $\omega_{si}$ is less than the outer race spin angular velocity $\omega_{so}$, in the same way as for the power roller 63.

The reason why the rotation axis angle γ can be set to the rotation axis angle γ2 at which the inner race spin is less than the outer race spin, will now be described in detail referring to FIG. 4.

Figure 4:
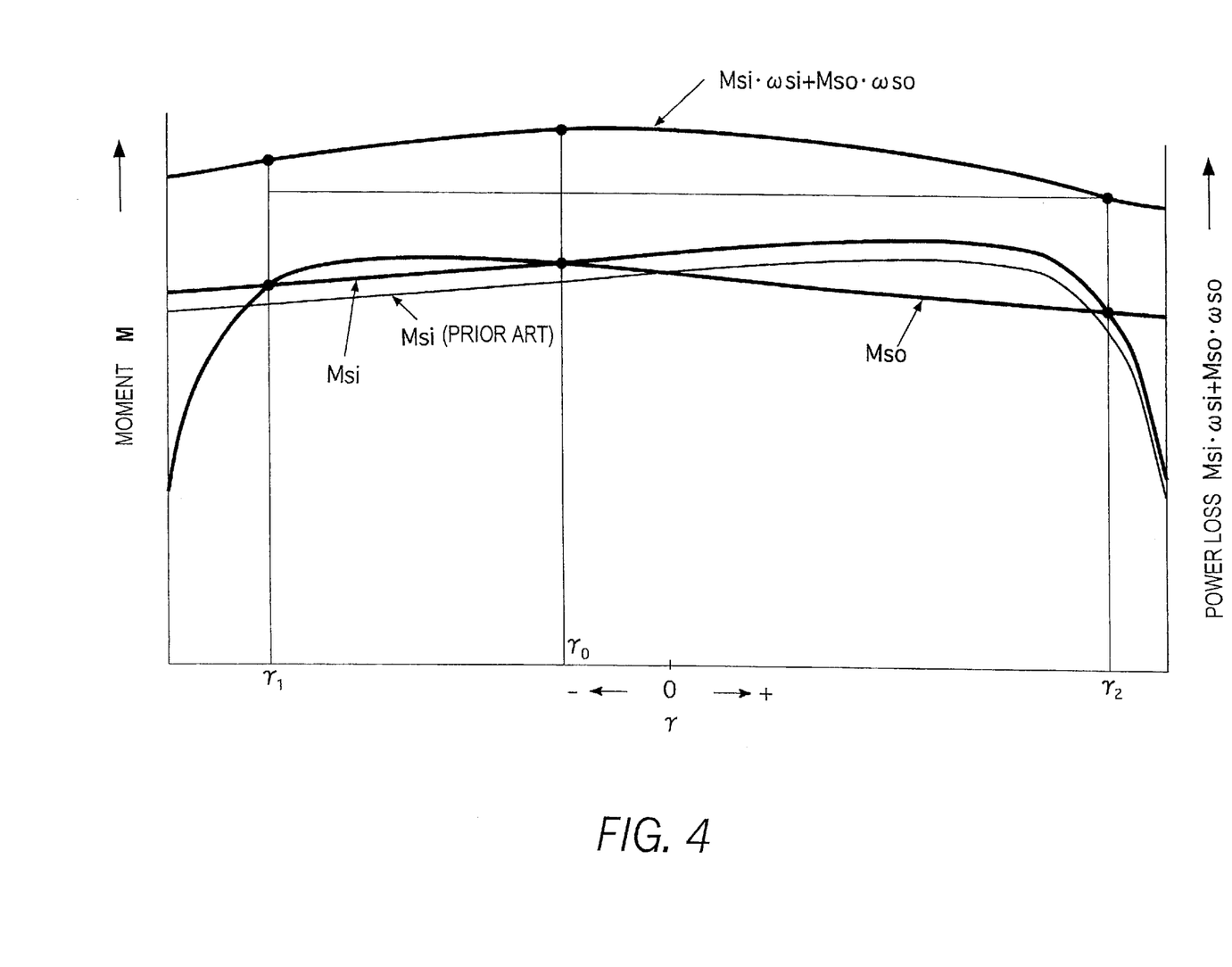
FIG. 4 shows the relation between a rotation axis angle of a ball of a thrust ball bearing and an inner race spin moment, the relation between a rotation axis angle of a ball of a thrust ball bearing and an outer race spin moment, and the relation between the rotation axis angle of the ball and a power loss, according to the first embodiment of this invention.

FIG. 4 shows the characteristics of the inner race spin moment $M_{si}$ of the first embodiment, the inner race spin moment $M_{si}$ of a prior art example (where $r_i = r_o$), the outer race spin moment $M_{so}$ and the power loss characteristics. These parameters were calculated using an elastic model according to "Proceedings of the Mechanical Engineering Institute of Japan", No. 89-0148B (1989), 512B.

The spin moment is obtained from a spin angular velocity depending on the rotation axis angle γ. The rotation axis angle γ of the ball 67a is determined by the balance between the inner race spin moment $M_{si}$ and outer race spin moment $M_{so}$. As shown in FIG. 4, at a first rotation axis angle γ0, second rotation axis angle γ1 and third rotation axis angle γ2, the spin moments (frictional moments) $M_{si}$, $M_{so}$ of the inner and outer races are balanced. The power loss is given by $M_{si} \cdot \omega si + M_{so} \cdot \omega so$.

At the third rotation axis angle γ2 where the inner race spin angular velocity $\omega_{si}$ is less than the outer race spin angular velocity $\omega_{so}$, the power loss is smallest. Therefore, during running of the CVT, the third rotation axis angle γ2 at which the power loss is minimized, is maintained. For example, even if the rotation axis angle γ instantaneously becomes the first or second rotation axis angles γ0, γ1, the rotation axis angle γ immediately returns to the third rotation axis angle γ2 at which the power loss is a minimum.

In the prior art toroidal CVT, unlike the case of this invention, the radius of curvature $r_i$ of the inner race groove 67c and the radius of curvature $r_o$ of the outer race groove 67d are set equal. Consequently, as shown in FIG. 13, in the prior art toroidal CVT, the absolute values of the second rotation axis angle γ1 and the third rotation axis angle γ2 are equal.

Figure 13:
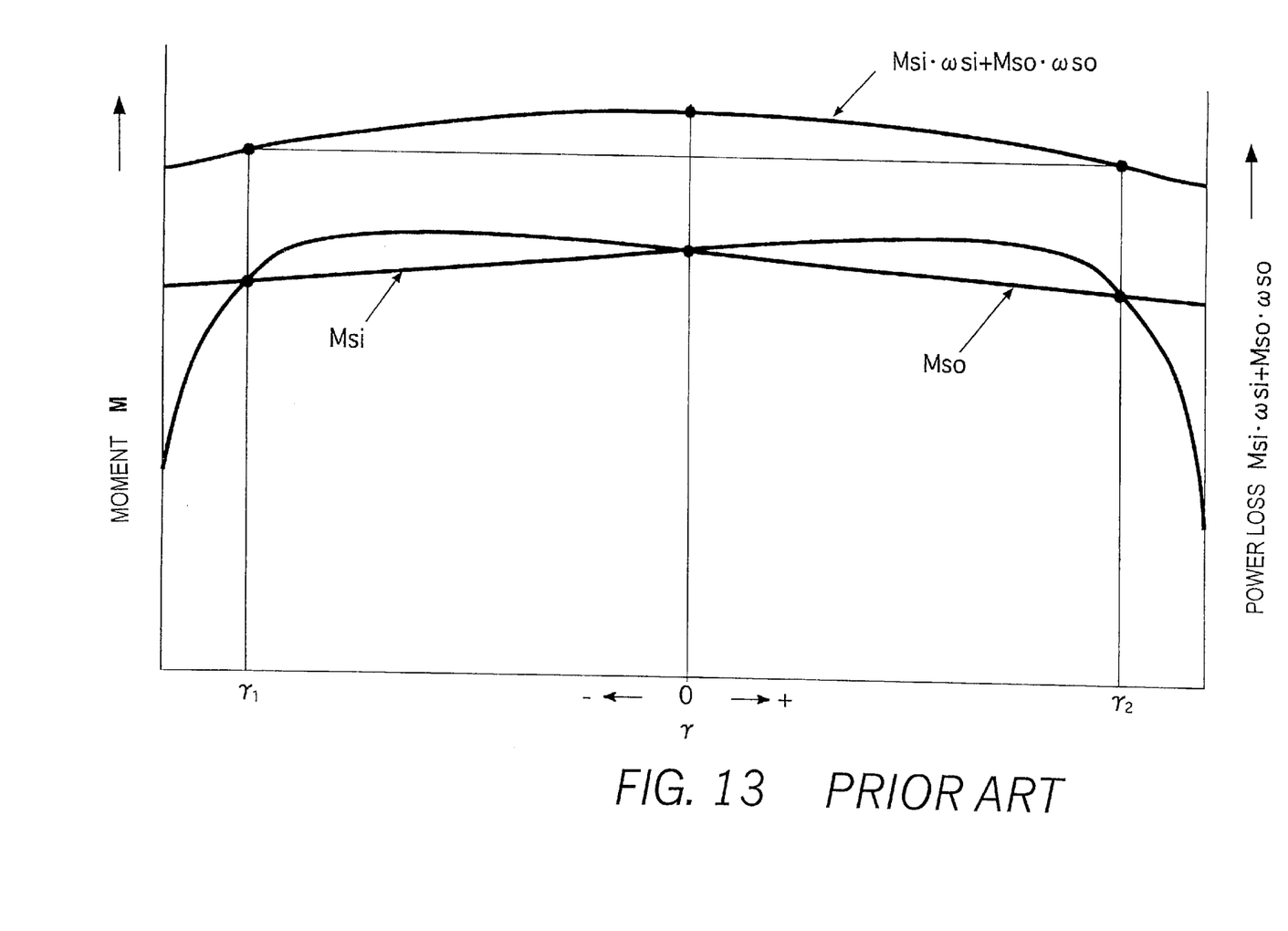
FIG. 13 shows the relation between a rotation axis angle of the ball and an inner race spin moment, the relation between a rotation axis angle of the ball and an outer race spin moment, and the relation between the rotation axis angle of the ball and power loss, according to the power roller of the prior art.

In the prior art toroidal CVT, as shown in FIG. 13, the rotation axis angle γ at which the spin moments $M_{si}$, $M_{so}$ are equal are the three points γ1, γ0 and γ2. However, at the point where γ=γ0, the power loss is larger than at the other two points, so γ=γ0 cannot be maintained. Therefore, the rotation axis angle γ takes a value of either γ1 or γ2 with a probability of 50%, and the rotation axis angle γ cannot be controlled. During running of the toroidal CVT, the rotation axis angle γ varies between γ1 and γ2.

On the other hand, in this invention, by making the radius of curvature $r_i$ of the inner race groove 67c smaller than the radius of curvature $r_o$ of the outer race groove 67d, due to a reason described later, the Hertzian contact area between the inner race groove 67c and the ball 67a can be set larger than the Hertzian contact area between the outer race groove 67d and the ball 67a.

The spin moment is directly proportional to the magnitude (moment span) of the Hertzian contact area. Therefore, the spin moment $M_{si}$ on the inner race side when the rotation axis angle is γ, is larger than the spin moment $M_{so}$ when the rotation axis angle is −γ. As shown in FIG. 4, at a rotation axis angle γ2 which is larger than in the prior art (i.e., $r_i=r_o$), the inner spin moment $M_{si}$ and outer spin moment $M_{so}$ balance. Thus, as the power loss is minimized, the direction of the rotation axis of the ball is stabilized at the rotation axis angle γ2.

By setting the Hertzian contact area between the inner race groove 67c and ball 67a, to be larger than the Hertzian contact area between the outer race groove 67d and ball 67a in this way, the direction of the rotation axis is stabilized at the positive rotation axis angle γ2.

Here, in the first embodiment, the reason that the Hertzian contact area of the inner race is larger than the Hertzian contact area of the outer race, will be described.

The principal curvature ρ (inverse 1/R of radius of curvature R) in the contact part between the inner race 64 and ball 67a, and contact part between the outer race 66 and ball 67a, is given by the following equations.

$$\rho_{11i}=\rho_{12i}=\rho_{11o}=\rho_{12o}=2/Da$$

$$\rho_{21i}=-1/r_i$$

$$\rho_{21o}=-1/r_o$$

$$\rho_{22i}=\rho_{22o}=0$$

Here, Da is the diameter of the ball 67a. $\rho_{11i}$ is the primary principal curvature of the ball 67a at the contact point on the inner race side, $\rho_{12i}$ is the secondary principal curvature of the ball 67a and contact point on the inner race side, $\rho_{11o}$ is the primary principal curvature of the ball 67a at the contact point on the outer race side, $\rho_{12o}$ is the secondary principal curvature of the ball 67a at the contact point on the outer race side, $\rho_{21i}$ is the primary principal curvature of the inner race groove 67c, $\rho_{21o}$ is the primary principal curvature of the outer race groove 67d, $\rho_{22i}$ is the secondary principal curvature of the inner race groove, and $\rho_{22o}$ is the secondary principal curvature of the outer race groove.

To compare the Hertzian contact area of the inner race 64 with the Hertzian contact area of the outer race 66, the values of $\rho_{21i}$ and $\rho_{21o}$ are compared. For simplicity, considering the case where the cylindrical inner surfaces of curvature $\rho_{21i}$ and curvature $\rho_{21o}$ come in contact with a cylinder of radius of curvature R, the respective combined curvatures $\Sigma\rho_i$, $\Sigma\rho_o$ are given as follows:

$$\Sigma\rho_i=(1/R)-(1/r_i)$$

$$\Sigma\rho_o=(1/R)-(1/r_o)$$

Here the combined curvature Σρ is the curvature when contact between cylinders is replaced by contact between a cylinder and a plane.

From the above equations, $\Sigma\rho_i<\Sigma\rho_o$, so the cylinder having a curvature of $\rho_{21i}$ has a larger contact area than the cylinder having a curvature of $\rho_{21o}$. Therefore, also in the contact between the groove and the ball, the inner race has a larger contact area.

The effect of the first embodiment can be summarized as follows.

In the first embodiment, by simply setting the curvature $\rho_i$ of the inner race groove 67c larger than the curvature $\rho_o$ of the outer race groove 67d, decrease of power transmission performance due to the ball spin of the thrust ball bearing 67 can be prevented.

Further, in the first embodiment, only the radii of curvature of the race grooves are varied. Consequently, the load on the ball is not increased, and the rotation axis of the ball can be set while maintaining the durability and reliability of the thrust ball bearing 67.

Next, a second embodiment of this invention will be described referring to FIG. 5 and FIG. 6.

Figure 5:
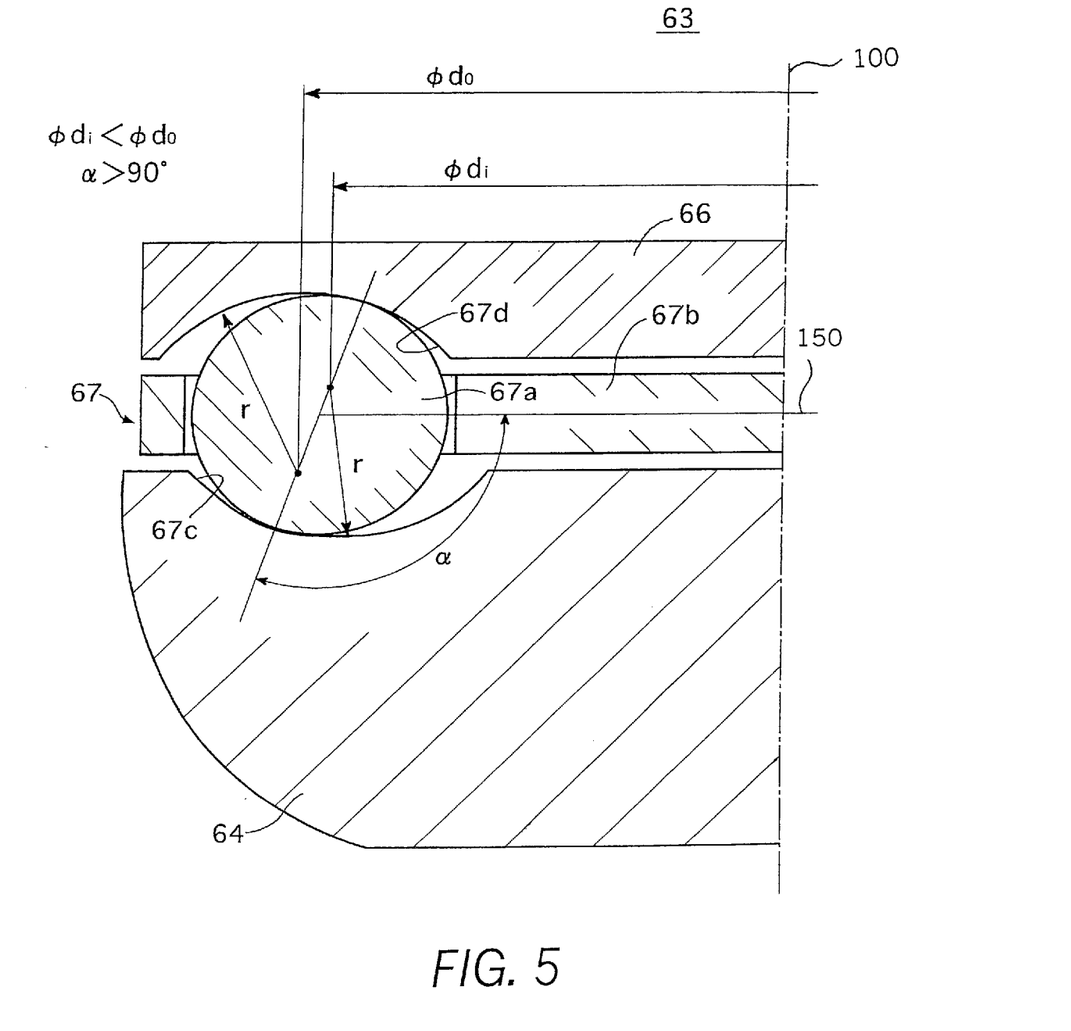
FIG. 5 is a partial sectional view of a power roller according to a second embodiment of this invention.
Figure 6:
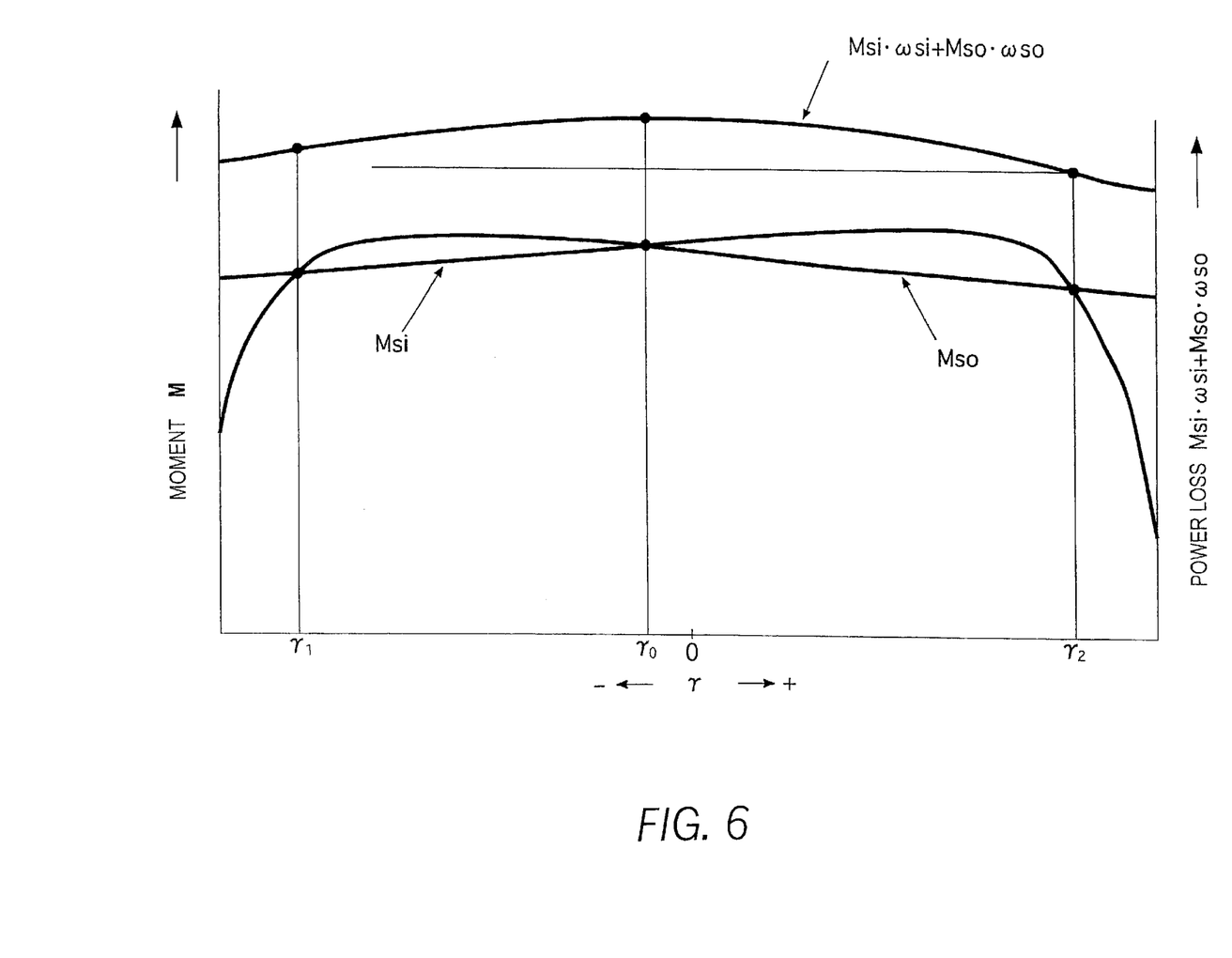
FIG. 6 shows the relation between a rotation axis angle of a ball of a thrust ball bearing and an inner race spin moment, the relation between a rotation axis angle of a ball of a thrust ball bearing and an outer race spin moment, and the relation between the rotation axis angle of the ball and a power loss, according to the second embodiment of this invention.

Referring to FIG. 5, in the thrust ball bearing 67, the inner race groove 67c and outer race groove 67d have an identical radius of curvature r. However, the pitch diameter $\phi d_i$ of the inner race groove 67c is smaller than the pitch diameter $\phi d_o$ of the outer race groove 67d. Here, the pitch diameter $\phi d_i$ of the inner race groove 67c is twice the distance from the center of the arc-shaped cross-section of the inner race groove 67c to the rotation axis of the power roller 63. The pitch diameter $\phi d_o$ of the outer race groove 67d is twice the distance from the center of the arc-shaped cross-section of the outer race groove 67d to the rotation axis of the power roller 63.

Hence, the Hertzian contact area between the inner race groove 67c and the ball 67a, is set larger than the Hertzian contact area between the outer race groove 67d and the ball 67a. The remaining features of the construction are identical to those of the first embodiment, and their description is omitted.

The effect of the second embodiment will now be described. Due to the relation between the pitch diameter $\phi d_i$ of inner race and the pitch diameter $\phi d_o$ of the outer race, the contact angle α is larger than 90 degrees when viewed from the inner race 64. At this time, the principal curvature in the contact part between the inner race 64 and ball 67a, and in the contact part between the outer race 66 and ball 67a, is given by the following equations.

$$\rho_{11i}=\rho_{12i}=\rho_{11o}=\rho_{12o}=2/Da$$

$$\rho_{21i}=\rho_{21o}=1/r$$

$$\rho_{22i}=2\cos\alpha/(\phi d_i - Da\cos\alpha)$$

$$\rho_{22o}=-2\cos\alpha/(\phi d_o + Da\cos\alpha)$$

Here, ρ is the curvature of the groove, α is the contact angle, Da is the ball diameter.

As α is larger than 90 degrees, $\rho_{22i}<\rho_{22o}$. Therefore, the Hertzian contact area on the inner race side is larger than the Hertzian contact area on the outer race side.

The characteristics of the spin moment $M_{si}$ on the inner race side, the characteristics of the spin moment $M_{so}$ on the outer race side and the power loss characteristics calculated using the aforesaid elastic model will now be described referring to FIG. 6.

The rotation axis angle γ of the ball 67a is determined by the balance between the inner race spin moment $M_{si}$ and the outer race spin moment $M_{so}$. The spin moment $M_{si}$ of the inner race and spin moment $M_{so}$ of the outer race are balanced at the first rotation axis angle γ0, second rotation axis angle γ1, and third rotation axis angle γ2. The power loss ($M_{si}\cdot\omega_{si}+M_{so}\cdot\omega_{so}$) is smallest at the rotation axis angle γ2 where the spin angular velocity $\omega_{si}$ of the inner race is smaller than the spin angular velocity $\omega_{so}$ of the outer race, and during the running of the toroidal CVT, the rotation axis angle γ2 at which power losses are minimized, is maintained.

Describing the effect, in the second embodiment, by simply setting the magnitudes of the pitch diameters $\phi d_i$, $\phi d_o$ of the inner race groove 67c and outer race groove 67d, heating of the inner race 64 can be prevented.

Next, a third embodiment will be described referring to FIG. 7 and FIG. 8.

Figure 7:
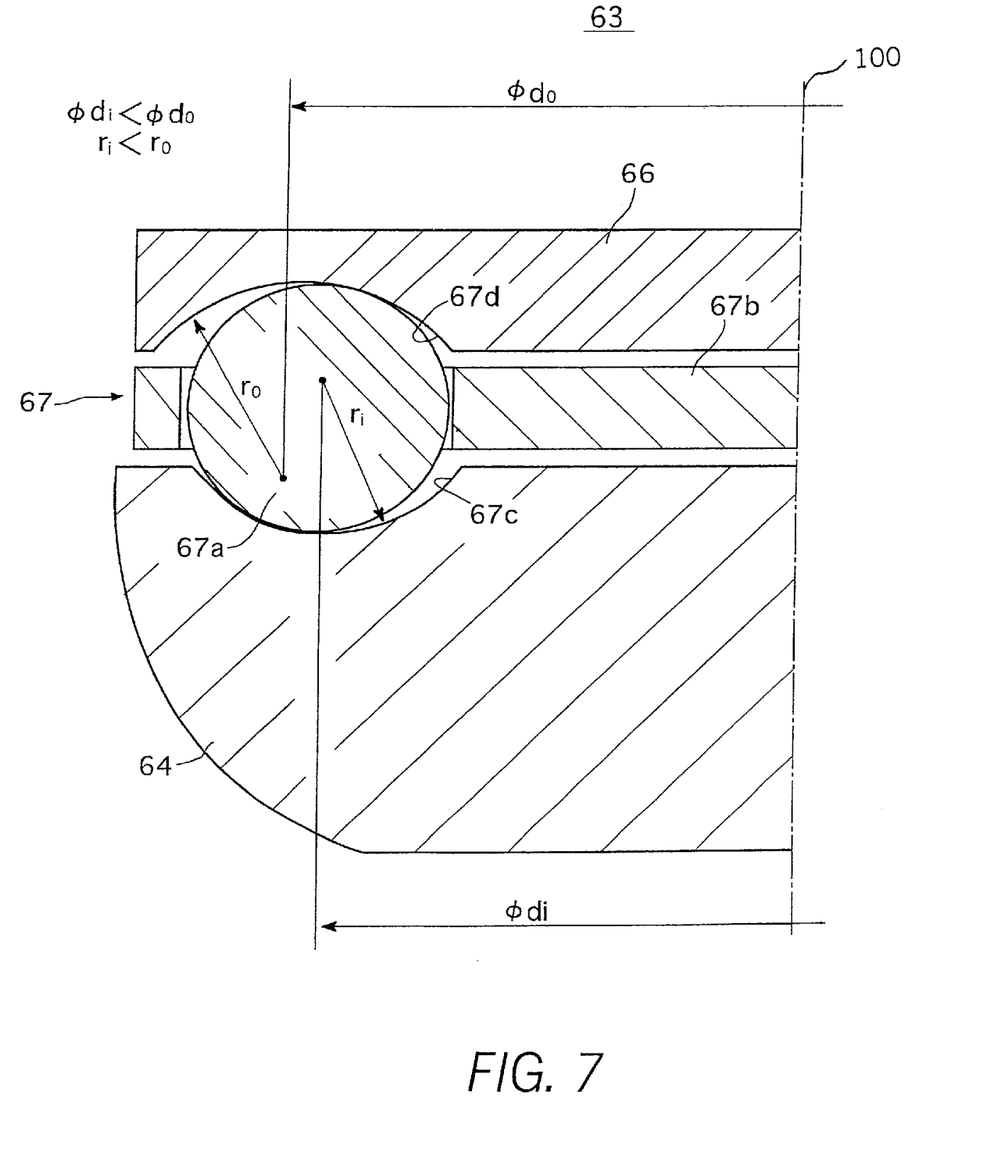
FIG. 7 is a partial cross-sectional view showing a power roller according to a third embodiment of this invention.
Figure 8:
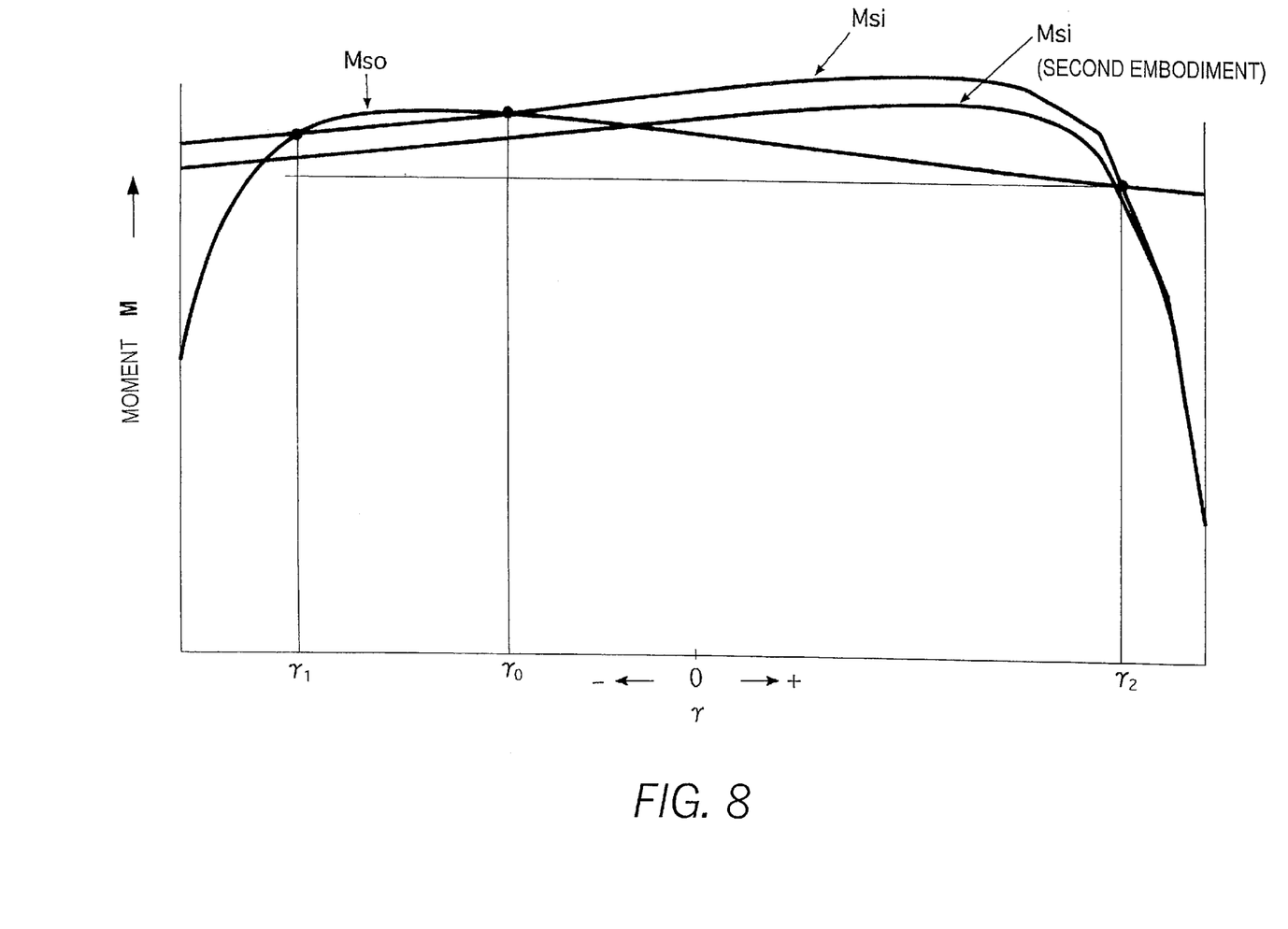
FIG. 8 shows the relation between a rotation axis angle of a ball of a thrust ball bearing and an inner race spin moment, and the relation between a rotation axis angle of a ball of a thrust ball bearing and an outer race spin moment, according to the third embodiment of this invention.

Referring to FIG. 7, in the third embodiment, the radius of curvature $r_i$ of the inner race groove 67c is smaller than the radius of curvature $r_o$ of the outer race groove 67d. Further, the pitch diameter $\phi d_i$ of the inner race groove 67c is smaller than the pitch diameter $\phi d_o$ of the outer race groove 67d. In this way, the Hertzian contact area between the inner race groove 67c and the ball 67a, is set larger than the Hertzian contact area between the outer race groove 67d and the ball 67a. The remaining features of the construction are identical to those of the first embodiment, and their description will be omitted.

As the radius of curvature $r_i$ of the inner race groove 67c is set smaller than the radius of curvature $r_o$ of the outer race groove 67d, the Hertzian contact area on the inner race side is set still larger than in the second embodiment. As shown in FIG. 8, the inner race spin moment $M_{si}$ of the third embodiment is larger than the inner race spin moment $M_{si}$ of the second embodiment. As a result, the difference of power loss between the state where the outer race spin moment is small (state of rotation axis angle $\gamma 1$) and the state where the inner race spin moment is small (state of rotation axis angle $\gamma 2$), increases, so the toroidal CVT can definitely be run in the state where the spin angular velocity $\omega_{si}$ of the inner race is smaller than the spin angular velocity $\omega_{so}$ of the outer race.

Describing the effect, in the third embodiment, an even larger difference in the Hertzian contact area can be produced between the inner race and outer race than in the first embodiment. For this reason, maintenance of the rotation axis angle $\gamma 2$ where the inner race spin is small, is more reliable. Therefore, decrease of power transmission performance due to the ball spin of the thrust ball bearing 27 can be prevented.

A fourth embodiment will now be described referring to FIG. 9 and FIG. 10.

Figure 9:
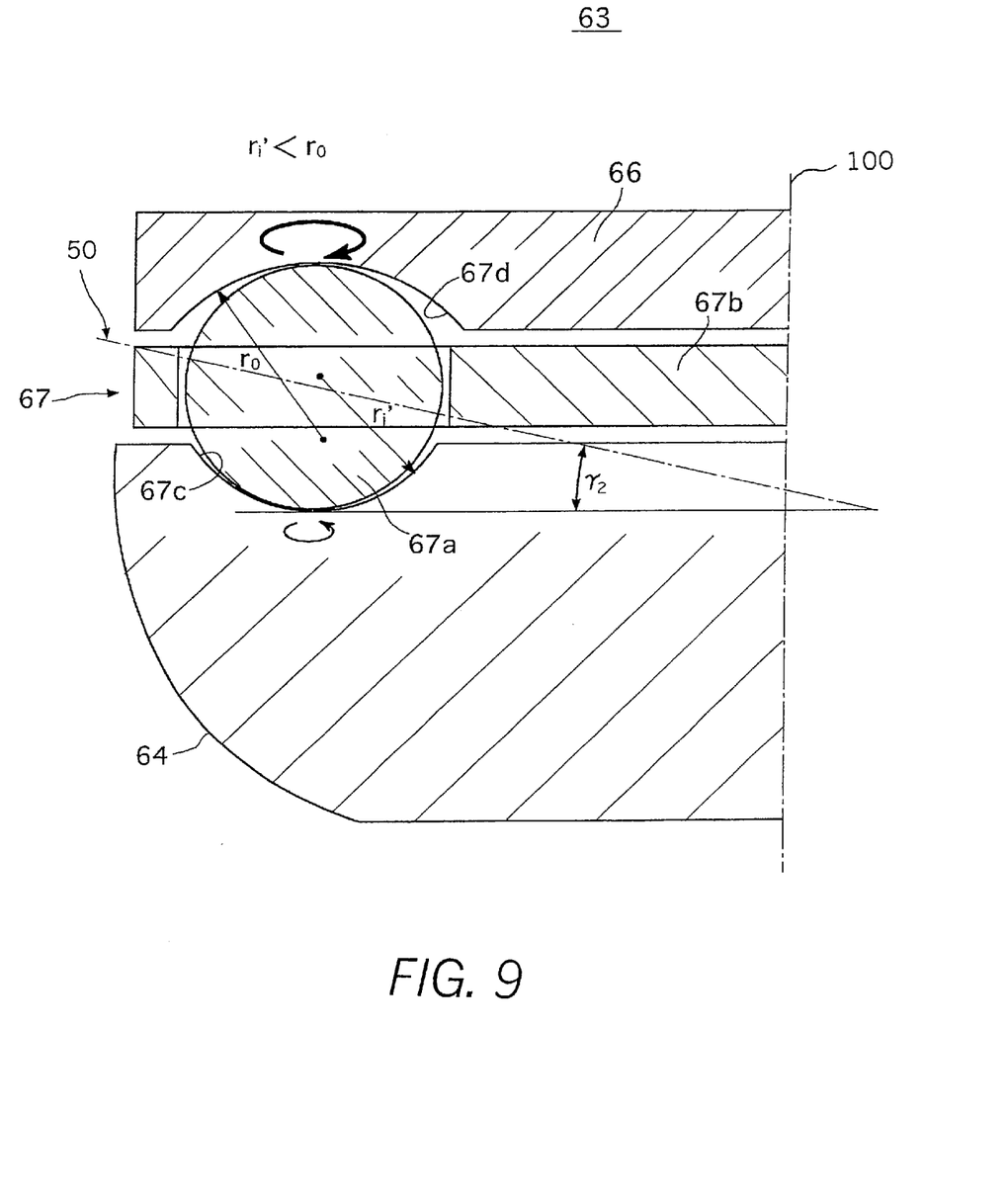
FIG. 9 is a partial cross-sectional view showing a power roller according to a fourth embodiment of this invention.

Referring to FIG. 9, a radius of curvature $r_i'$ of the inner race groove 67c of the thrust ball bearing 67 is set still smaller than the radius of curvature $r_i$ of the inner race groove 67c of the first embodiment, so that there is only one rotation axis angle of the ball at which the inner race spin moment $M_{si}$ and outer race spin moment $M_{so}$ are balanced. The radius of curvature $r_o$ of the outer race groove 67d is identical to that of the first embodiment, but the Hertzian contact area between the inner race groove 67c and ball 67a is set larger than the Hertzian contact area between the outer race groove 67d and ball 67a. The remaining features of the construction are identical to those of the first embodiment, and their description will be omitted.

Figure 10:
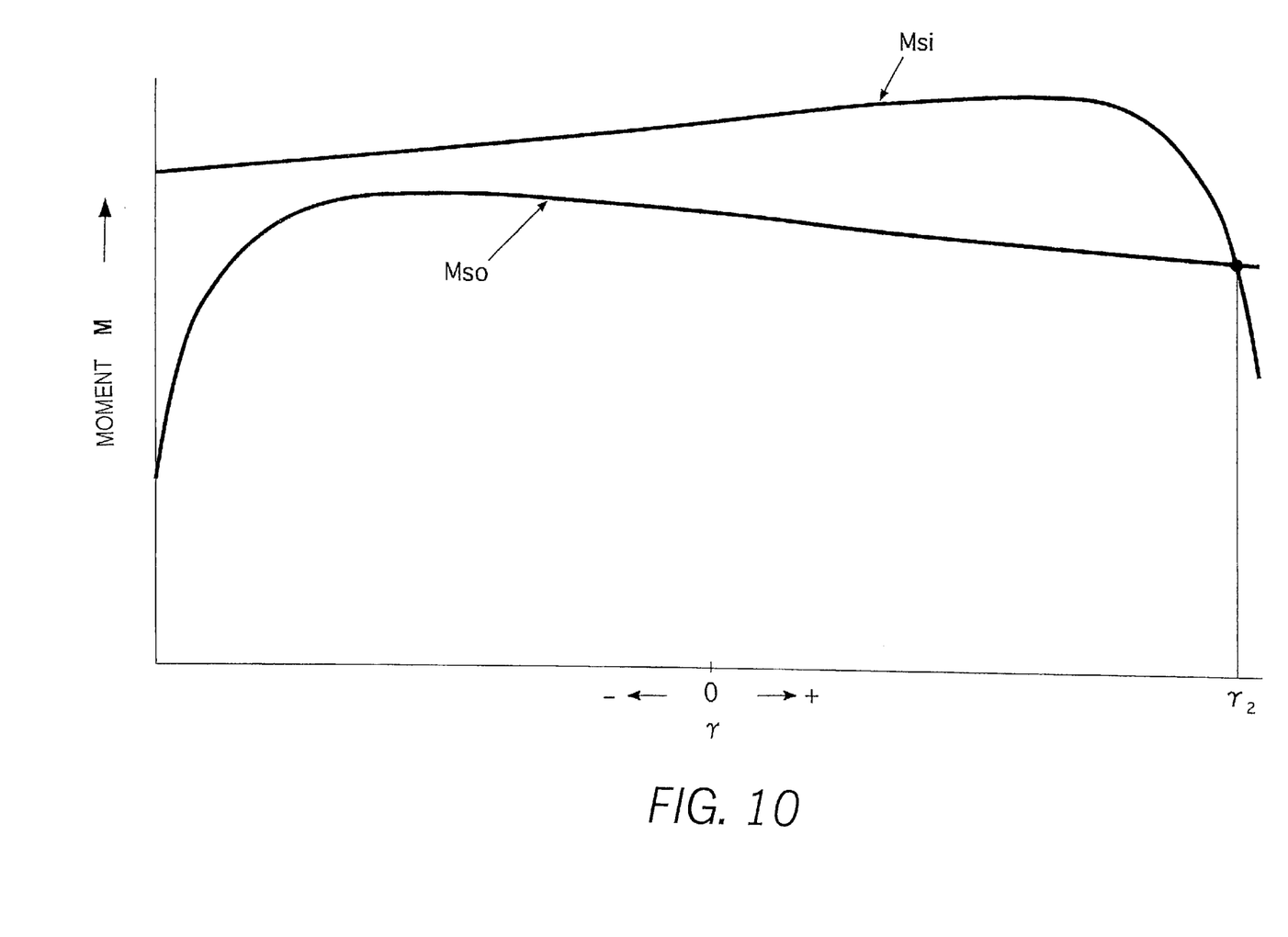
FIG. 10 shows the relation between a rotation axis angle of a ball of a thrust ball bearing and an inner race spin moment, and the relation between a rotation axis angle of a ball of a thrust ball bearing and an outer race spin moment, according to the fourth embodiment of this invention.

As shown in FIG. 10, the inner race spin moment $M_{si}$ and outer race spin moment $M_{so}$ are balanced only at the rotation axis angle $\gamma 2$. Therefore, in the fourth embodiment, the rotation axis angle $\gamma 2$ at which the inner race spin is small, can be reliably maintained during the running of the toroidal CVT. Further, decrease in power transmission performance due to the ball spin of the thrust ball bearing 27, can be prevented.

Figure 11:
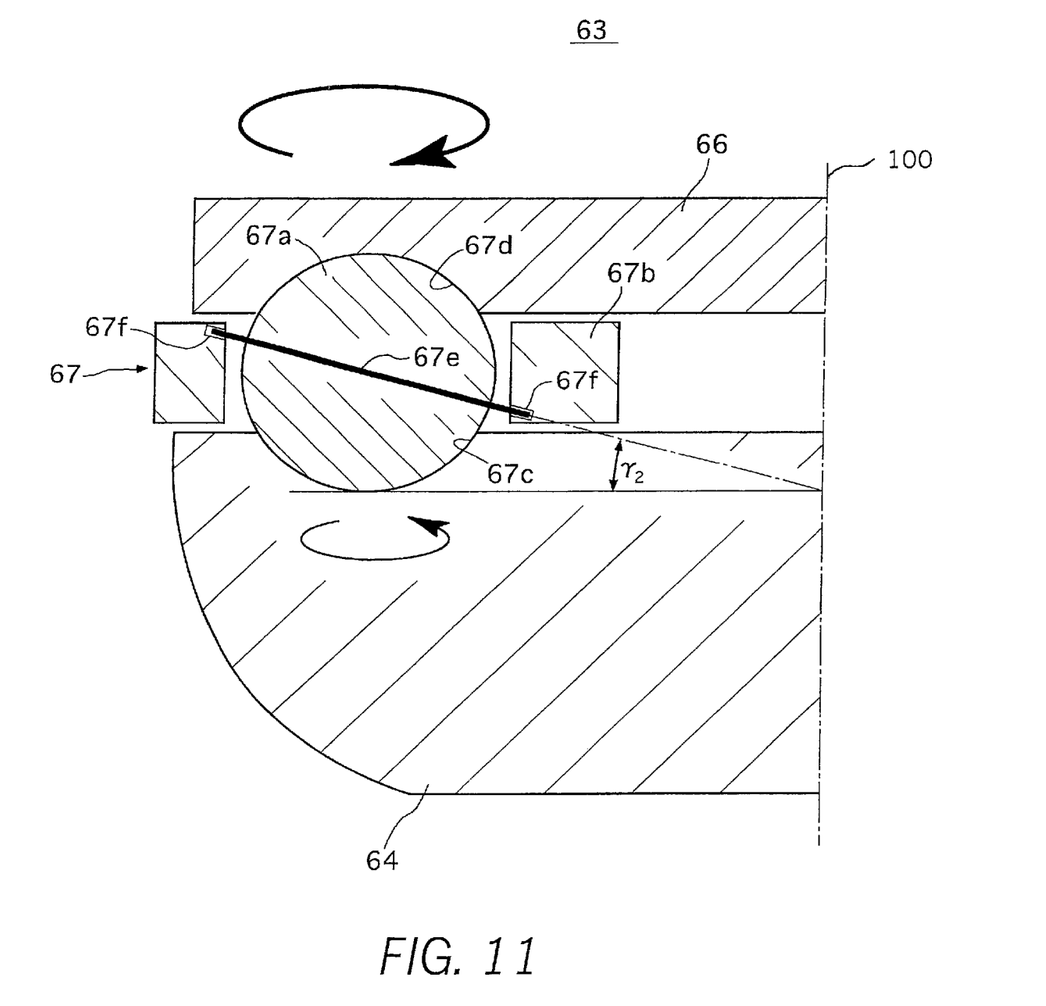
FIG. 11 is a partial cross-sectional view showing a power roller according to a fifth embodiment of this invention.

A fifth embodiment will now be described referring to FIG. 11.

The ball 67a of the thrust ball bearing 67 is pressed into a penetrating shaft 67e. By inserting the ends of the penetrating shaft 67e into supporting holes 67f provided in the holder 67b, the direction of the rotation axis 50 of the ball 67a is restricted to the direction of the penetration shaft 67e. In this way, the rotation axis 50 of the ball 67a is fixed by the penetration shaft 67e at the rotation axis angle $\gamma 2$ at which the inner race spin is smaller than the outer race spin.

In the fifth embodiment, generation of heat in the inner race groove is definitely suppressed in all running states of the toroidal CVT, and decrease of power transmission performance due to the ball spin of the thrust ball bearing 67 is prevented.

Figure 12:
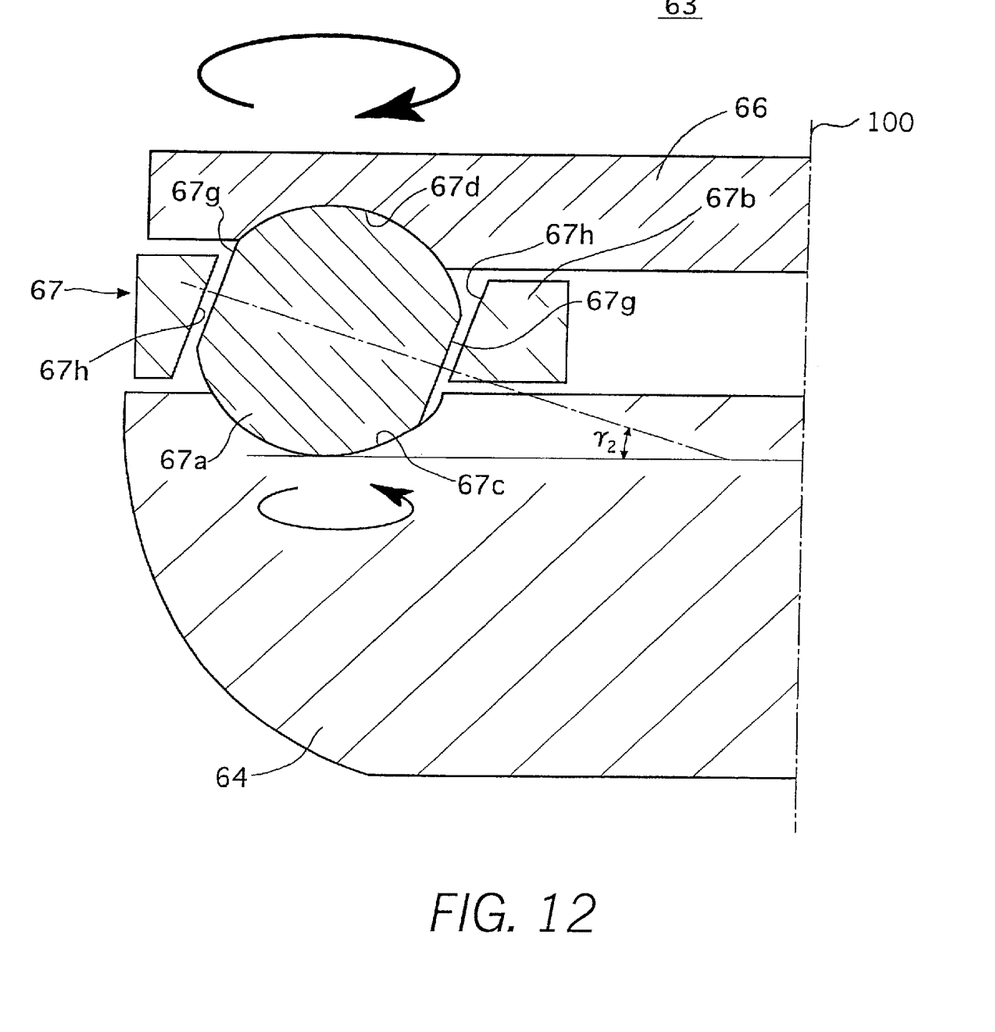
FIG. 12 is a partial cross-sectional view showing a power roller according to a sixth embodiment of this invention.

A sixth embodiment of this invention will now be described referring to FIG. 12.

The ball 67a of the thrust ball bearing 67 has two plane parts 67g which are mutually parallel, and the holder 67 comprise two guide planes 67h opposite the plane parts 67g. In this way, the direction of the rotation axis 50 of the ball 67a is restricted. By restricting the rotation axis 50 of the ball 67a, the rotation axis angle $\gamma$ of the ball 67a is set to the rotation axis angle $\gamma 2$ at which the inner race spin is less than the outer race spin.

Due to the guide planes 67h of the holder 67b, the rotation of the ball 67a can be guided without changing the positions of the plane parts 67g of the ball 67a relative to the holder 67b. In this way, the rotation axis angle of the ball 67a is fixed at the angle $\gamma 2$ at which the inner race spin angular velocity $\omega_{si}$ is less than the outer race spin angular velocity $\omega_{so}$.

In the sixth embodiment, generation of heat in the inner race groove is suppressed small in all running states of the toroidal CVT.

Thus, decrease in the power transmission performance due to the ball spin of the thrust ball bearing 67 can be prevented.

In this invention, as the rotation axis angle $\gamma$ of the ball is determined by the balance between the inner race spin moment $M_{si}$ between the ball and inner race groove, and the outer race spin moment $M_{so}$ between the ball and outer race groove, the rotation axis angle $\gamma$ of the ball is set to the angle $\gamma 2$ at which the inner race spin angular velocity $\omega_{si}$ is less than the outer race spin angular velocity $\omega_{so}$. Based on this technical concept, this invention may be implemented by techniques other than those of the first to sixth embodiments.

Further, this invention may be applied also to an infinitely variable transmission (IVT) wherein a toroidal continuously variable transmission is used.

The entire contents of Japanese Patent Applications P2000-316332 (filed Oct. 17, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A power roller for a toroidal continuously variable transmission, comprising:

an inner race for transmitting power between an input disk and an output disk via an oil film, an outer race supported by a power roller support member, and a thrust ball bearing for supporting the inner race on the outer race such that the inner race is free to rotate, wherein the thrust ball bearing has an inner race groove having an arc-shaped cross-section formed in the inner race, and an outer race groove having an arc-shaped cross-section formed in the outer race, an annular space defined by the inner race groove and outer race groove, plural balls disposed in the annular space, and a holder for supporting the balls, wherein a first spin occurs in the contact part between each of the balls and the inner race groove which is the slip between each of the balls and inner race groove, wherein each of the balls and the inner race groove rotate relative to each other, and a second spin occurs in the contact part between each of the balls and the outer race groove which is the slip between each of the balls and the outer race groove, wherein each of the balls and outer race groove rotate relative to each other, and wherein the inner race groove has a radius of curvature less than the radius of curvature of the outer race groove, and a pitch diameter less than the pitch diameter of the outer race groove such that the direction of the rotation axis of the balls, defined by the balance between the frictional moment of the first spin and the frictional moment of the second spin, is set to a direction in which the angular velocity of the first spin is less than the angular velocity of the second spin.

2. The power roller for a toroidal continuously variable transmission as defined in claim 1, wherein the direction of the rotation axis of the ball is set to a direction in which the rotation axis of the power roller and the rotation axis of the ball substantially intersects at a point on the side of the inner race with respect to a revolution plane of the ball, the revolution plane passing through the center of the ball and being perpendicular to the rotation axis of the power roller.

3. The power roller for a toroidal continuously variable transmission as defined in claim 1, wherein a Hertzian contact area between the inner race groove and the ball, is larger than a Hertzian contact area between the outer race groove and the ball.

4. The power roller for a toroidal continuously variable transmission as defined in claim 1, wherein the thrust ball bearing comprises means for restricting the rotation axis direction of the ball.

5. The power roller for a toroidal continuously variable transmission as defined in claim 1, wherein the holder and balls comprise a structure for restricting the rotation axis direction of the ball.

6. The power roller for a toroidal continuously variable transmission as defined in claim 1, wherein an angle formed by the rotation axis of the ball and a plane perpendicular to the rotation axis of the power roller, is set to an angle at which a first spin angular velocity is less than a second spin angular velocity.

* * * * *